United States Patent
An et al.

(10) Patent No.: US 12,511,294 B2
(45) Date of Patent: *Dec. 30, 2025

(54) OFFLOADING DATA INTERFACING METHOD BETWEEN DBMS STORAGE ENGINE AND COMPUTATIONAL STORAGE DEVICE

(71) Applicant: Korea Electronics Technology Institute, Seongnam-si (KR)

(72) Inventors: Jae Hoon An, Incheon (KR); Young Hwan Kim, Yongin-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 102 days.

This patent is subject to a terminal disclaimer.

(21) Appl. No.: 17/986,029

(22) Filed: Nov. 14, 2022

(65) Prior Publication Data
US 2023/0153306 A1   May 18, 2023

(30) Foreign Application Priority Data
Nov. 15, 2021  (KR) .................. 10-2021-0156265

(51) Int. Cl.
G06F 16/2455   (2019.01)
G06F 16/25     (2019.01)

(52) U.S. Cl.
CPC ...... *G06F 16/24564* (2019.01); *G06F 16/252* (2019.01)

(58) Field of Classification Search
None
See application file for complete search history.

(56) References Cited

U.S. PATENT DOCUMENTS

| | | | |
|---|---|---|---|
| 8,705,572 B2 * | 4/2014 | Pandit | H04L 41/06 709/212 |
| 10,740,152 B2 * | 8/2020 | Bobba | G06F 9/5044 |
| 10,802,883 B2 * | 10/2020 | Alameldeen | G06F 9/485 |
| 10,853,125 B2 * | 12/2020 | Ganesan | G06F 9/5044 |

(Continued)

FOREIGN PATENT DOCUMENTS

| | | | | |
|---|---|---|---|---|
| EP | 3343387 A1 * | 7/2018 | ......... | G06F 15/8092 |
| EP | 3657329 A1 * | 5/2020 | ........... | G06F 9/4881 |

(Continued)

OTHER PUBLICATIONS

Erfan, Mohammad, Bidoura Ahmad Hridita, Mohammad Shoyaib, and Md Shariful Islam. "A comprehensive survey of code offloading mechanisms for mobile cloud computing." IUT Journal of Engineering and Technology (JET), vol. 13, No. 1, Dec. 2016 (Year: 2016).*

(Continued)

Primary Examiner — Uyen T Le
(74) Attorney, Agent, or Firm — NSIP Law (57) ABSTRACT

There is provided an offloading data interfacing method between a DBMS storage engine and a computational storage device. In a query offloading method according to an embodiment of the disclosure, a DBMS may generate an offloading code which is a code for offloading a part of query computations, based on a received query, when a query execution request is received from a client, and may deliver the offloading code to a storage in which a DB is established in a CSD. Accordingly, in a DB system using a CSD, a snippet for offloading a part of query computations may be defined, and a DBMS and a storage are interfaced by using the offloading snippet, so that a guideline for execution of a query by interworking between the CSD-based storage and the DBMS is provided.

17 Claims, 7 Drawing Sheets

(56) References Cited

U.S. PATENT DOCUMENTS

| | | | | |
|---|---|---|---|---|
| 2005/0149817 | A1* | 7/2005 | Biran | H04L 1/0083 714/758 |
| 2011/0145360 | A1* | 6/2011 | Sheshagiri | G06F 9/547 717/110 |
| 2014/0181823 | A1* | 6/2014 | Manula | G06F 9/546 718/102 |
| 2018/0157710 | A1* | 6/2018 | Guirguis | G06F 16/27 |
| 2018/0307728 | A1* | 10/2018 | Crupi | G06F 16/24549 |
| 2020/0073987 | A1* | 3/2020 | Perumala | G06F 16/24545 |
| 2021/0019093 | A1* | 1/2021 | Karr | G06F 3/0653 |
| 2021/0271680 | A1* | 9/2021 | Lee | G06F 9/30038 |
| 2022/0019441 | A1* | 1/2022 | Rosing | G06N 3/084 |
| 2022/0156163 | A1* | 5/2022 | Pasupuleti | G06F 16/24537 |
| 2023/0069222 | A1* | 3/2023 | Skazinski | G06F 8/51 |
| 2023/0153317 | A1* | 5/2023 | An | G06F 16/252 707/718 |

FOREIGN PATENT DOCUMENTS

| | | | | |
|---|---|---|---|---|
| EP | 3872646 A1 * | 9/2021 | | G06F 12/0246 |
| WO | WO-2020172650 A1 * | 8/2020 | | |

OTHER PUBLICATIONS

Ferreira, Luis Lino, Guilherme Silva, and Luis Miguel Pinho. "Service offloading in adaptive real-time systems." In ETFA2011, pp. 1-6. IEEE, 2011. (Year: 2011).*

Berg, Florian, Frank Dürr, and Kurt Rothermel. "Increasing the efficiency of code offloading through remote-side caching." 2015 IEEE 11th International Conference on Wireless and Mobile Computing, Networking and Communications (WiMob). IEEE, 2015 (Year: 2015).*

Docan C, Parashar M, Cummings J, Klasky S. Moving the code to the data-dynamic code deployment using activespaces. In2011 IEEE International Parallel & Distributed Processing Symposium May 1, 20116 (pp. 758-769). IEEE. (Year: 2011).*

Benedetto, José I., Luis A. González, Pablo Sanabria, Andrés Neyem, and Jaime Navón. "Towards a practical framework for code offloading in the Internet of Things." Future Generation Computer Systems 92 (2019): 424-437. (Year: 2019).*

Qiao, Lin, et al. "Integration of Server, Storage and Database Stack: Moving Processing Towards Data." 2008 IEEE 24th International Conference on Data Engineering. IEEE, 2008.

Rahman, Md. Arif, et al. "A Survey on Declarative Code Offloading Techniques in Different In-Memory RDBMSs in Federated Environment." Korean Society of Information Scientists and Engineers Academic Presentation Papers (2020): 74-76.

Wilcox, Peter, et al. "Design for Computational Storage Simulation Platform." Proceedings of the Workshop on Challenges and Opportunities of Efficient and Performant Storage Systems. 2021, (8 pages).

Korean Office Action issued on Aug. 3, 2023, in counterpart Korean Patent Application No. 10-2021-0156265 (7 pages in English, 9 pages in Korean).

* cited by examiner

OFFLOADING DATA INTERFACING METHOD BETWEEN DBMS STORAGE ENGINE AND COMPUTATIONAL STORAGE DEVICE

CROSS-REFERENCE TO RELATED APPLICATION(S) AND CLAIM OF PRIORITY

This application is based on and claims priority under 35 U.S.C. § 119 to Korean Patent Application No. 10-2021-0156265, filed on Nov. 15, 2021, in the Korean Intellectual Property Office, the disclosure of which is herein incorporated by reference in its entirety.

BACKGROUND

Field

The disclosure relates to a database (DB) system, and more particularly, to a processing data interfacing method between a database management system (DBMS) and a storage in an environment where the DBMS and the storage in which a DB is established are disaggregated.

Description of Related Art

In a query execution process, a database management system (DBMS) may acquire data by scanning a query in a database (DB), filter the acquired data, and return only the filtered data to a client.

However, when there are many data to be scanned in the DB, many data are transmitted from a storage in which the DB is established to the DBMS, and accordingly, there are problems that a bandwidth becomes scarce and an overall response speed is reduced, and power consumption increases.

As a solution to these problems, there is a method of implementing the storage of the DB by using a computational storage drive (CSD), and allowing the storage to perform a part of the query computations. However, a specific method to achieve this has not yet been proposed.

SUMMARY

The disclosure has been developed to address the above-discussed deficiencies of the prior art, and an object of the present disclosure is to provide a method of defining a snippet for offloading a part of query computations in a DB system using a CSD, and interfacing a DBMS and a storage by using an offloading snippet.

According to an embodiment of the disclosure to achieve the above-described object, a query offloading method may include: a step of receiving, by a DBMS, a query execution request from a client; a step of generating, by the DBMS, an offloading code which is a code for offloading a part of the query computations, based on the received query; and a step of delivering, by the DBMS, the offloading code to a storage in which a DB is established in a CSD.

According to an embodiment of the disclosure, the query offloading method may further include a step of determining, by the DBMS, whether to offload a part of query computations, and the step of generating may be performed when offloading is determined at the step of determining.

The step of determining may include determining by determining which is appropriate, the DBMS processing all of the query computations, or the storage processing a part of the query computations and the DMBS processing the other query computations.

The step of determining may include determining to offload a part of the query computations when there is a large amount of data transmitted between the DBMS and the storage.

According to an embodiment of the disclosure, the query offloading method may further include: a step of receiving, by the CSD of the storage, the offloading code from the DBMS; a step of checking, by the CSD, validity of the received offloading code, and parsing; a step of reading out, by the CSD, data from the DB by scanning the query recorded on the offloading code; a step of filtering, by the CSD, the read-out data; and a step of returning, by the CSD, the filtered data to the DBMS.

The step of returning may further include: a step of checking, by the CSD, validity of the filtered data; a step of checking, by the CSD, validity of a buffer address recorded on the offloading code; a step of converting, by the CSD, the filtered data into a Json type; and a step of storing, by the CSD, the filtered and converted data in a buffer indicated by the buffer address.

The step of storing may include moving the data from a buffer of the CSD to a buffer indicated by the buffer address in a remote DMA method without passing through a CPU of the CSD. The buffer indicated by the buffer address may be a buffer of the DBMS.

The offloading code may be generated as a snippet, and may include a parsed query and a buffer address of the DBMS.

According to another embodiment of the disclosure, a DB system may include: a storage in which a DB is established in a CSD; and a DBMS configured to generate an offloading code which is a code for offloading a part of query computations, based on a received query, when a query execution request is received from a client, and to deliver the offloading code to the storage.

According to still another embodiment of the disclosure, a query offloading method may include: a step of generating, by a DBMS, an offloading code which is a code for offloading a part of query computations, based on a query; a step of delivering, by the DBMS, the offloading code to a storage in which a DB is established in a CSD; and a step of receiving, by the DBMS, a result of executing the offloading code from the CSD.

According to yet another embodiment of the disclosure, a DB system may include: a storage in which a DB is established in a CSD; and a DBMS configured to generate an offloading code which is a code for offloading a part of query computations, based on a query, to deliver the offloading code to the storage; and to receive a result of executing the offloading code from the CSD.

According to embodiments of the disclosure as described above, in a DB system using a CSD, a snippet for offloading a part of query computations may be defined, and a DBMS and a storage are interfaced by using the offloading snippet, so that a guideline for execution of a query by interworking between the CSD-based storage and the DBMS is provided.

In addition, according to embodiments of the disclosure, an RDMA connection interface between the DBMS and the CSD is supported, so that a data transmission speed for an offloading processing process is maximized and a query execution time is reduced.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in detail with reference to the accompanying drawings.

An embodiment of the disclosure provides a method for defining a snippet for offloading (pushing down) a part of query computations onto a CSD in a DB system using the CSD, and processing query computations by a DBMS and a storage interworking with each other by using the snippet.

Figure 1:
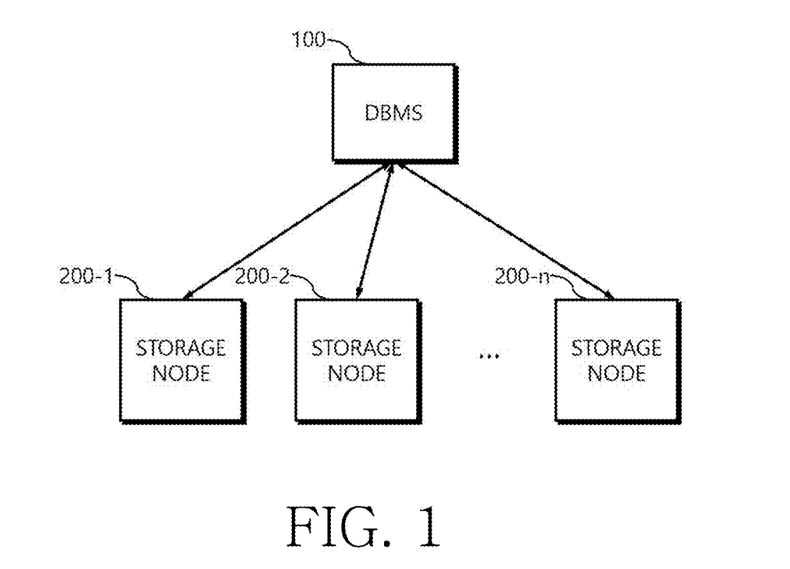
FIG. 1 is a view illustrating a DB system according to an embodiment of the disclosure.

FIG. 1 is a view illustrating a DB system according to an embodiment of the disclosure. The DB system according to an embodiment of the disclosure may be divided into a DBMS 100 and a plurality of storage nodes 200-1, 200-2, . . . , 200-n as shown in the drawing.

The storage nodes 200-1, 200-2, . . . , 200-n refer to storage systems in which the same DB is established. The plurality of storage nodes 200-1, 200-2, . . . , 200-n may be implemented in order to process many queries which are requested simultaneously.

Furthermore, the storage nodes 200-1, 200-2, . . . , 200-n include a computation function, and may perform a part of query computations.

The DBMS 100 is a system that executes a query according to a request of a client (not shown) and returns a result thereof. All of the query computations may be performed by the DBMS 100, but a part of the query computations may be offloaded onto the storage nodes 200-1, 200-2, . . . , 200-n.

Figure 2:
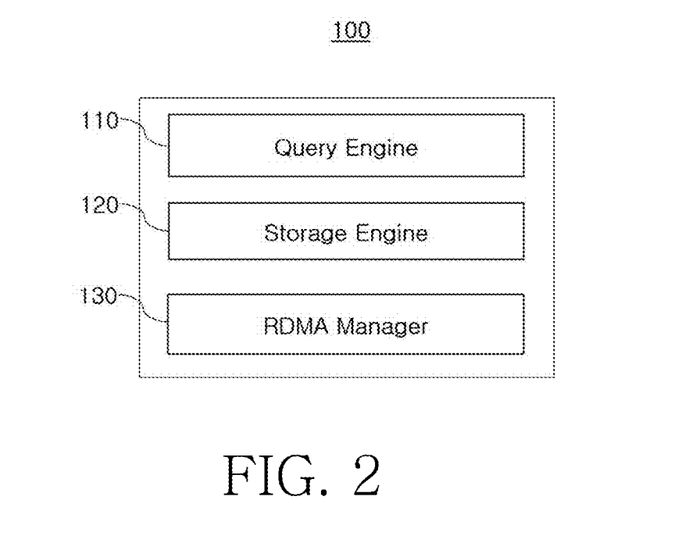
FIG. 2 is a view illustrating a structure of the DBMS shown in FIG. 1.

FIG. 2 is a view illustrating a structure of the DBMS 100 shown in FIG. 1. As shown in the drawing, the DBMS 100 may include a query engine 110, a storage engine 120, and a remote direct memory access (RDMA) manager 130.

Upon receiving a query execution request from a client, the query engine 110 may optimize the received query and deliver the same to the storage engine 120.

The storage engine 120 may determine whether to offload query computations. Offloading query computations may refer to offloading a part of the query computations onto the storage nodes 200-1, 200-2, . . . , 200-n. A part of the query computations may include query scanning, filtering, and validation.

It may be determined whether the query computations are offloaded by determining whether it is appropriate for the query engine 110 to execute all of the query computations, or whether it is appropriate for the storage nodes 200-1, 200-2, . . . , 200-n to execute a part of the query computations, and for the query engine 110 to execute the other query computations.

When there is a large amount of data transmitted between the DBMS 100 and the storage nodes 200-1, 200-2, . . . , 200-n in executing the query, that is, when there are many data to be scanned, offloading the query computations may be appropriate, but in other cases, offloading the query computations may be inappropriate.

The storage engine 120 generates a query computation offloading snippet based on the query, and delivers the generated query computation offloading snippet to the RDMA manager 130.

Figure 3:
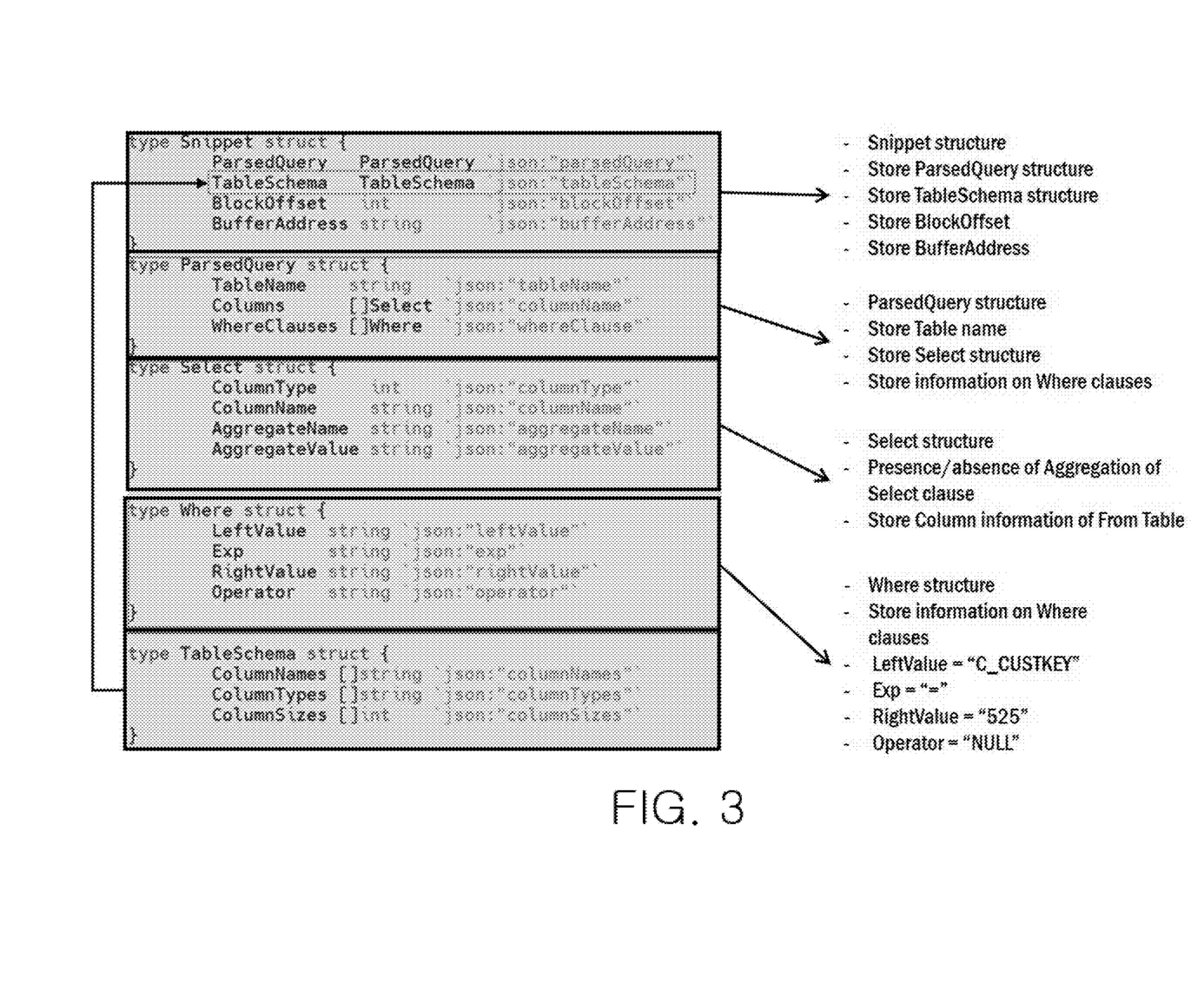
FIG. 3 is a view illustrating a structure of a query computation offloading snippet.

The query computation offloading snippet generated by the storage engine 120 is a source code for offloading a part of the query computations onto the storage node 200-1, 200-2, . . . , 200-n, and a detailed structure thereof is illustrated in FIG. 3.

As shown in the drawing, the query computation offloading snippet includes ParsedQuery, TableSchema, BlockOffset, and BufferAddress. The ParsedQuery may include a Select statement and a Where clause. The BufferAddress refers to an address of a buffer (not shown) that stores a result of performing a part of the query computations according to the query computation offloading snippet. The buffer is provided in the RDMA manager 120.

The RDMA manager 130 delivers the query computation offloading snippet generated by the storage engine 120 to the storage nodes 200-1, 200-2, . . . , 200-n, and receives a result of performing the query computation offloading snippet from the storage nodes 200-1, 200-2, . . . , 200-n and delivers the result to the storage engine 120.

Figure 4:
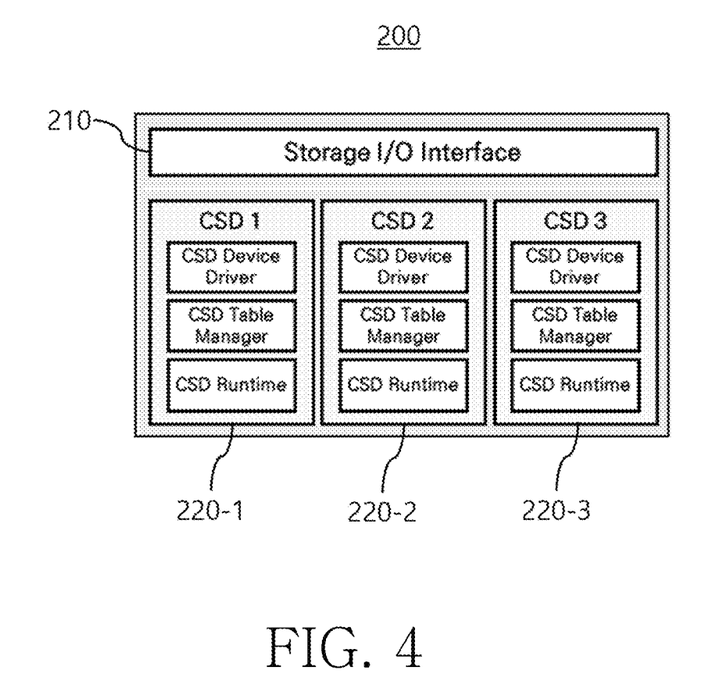
FIG. 4 is a view illustrating a structure of the storage node shown in FIG. 1.

FIG. 4 is a view illustrating a structure of the storage nodes 200-1, 200-2, . . . , 200-n shown in FIG. 1. Since the storage nodes 200-1, 200-2, . . . , 200-n may be implemented in the same way, only one storage node 200 is illustrated in FIG. 4 as a representative by using reference numeral "200."

As shown in the drawing, the storage node 200 may include a storage I/O interface 210 and a plurality of CSDs 220-1, 220-2, 220-3.

The storage I/O interface 210 may be an interface for communicating with the DBMS 100, and, when a query computation offloading snippet is delivered from the RDMA manager 130 of the DBMS 100, the storage I/O interface 210 may deliver the query computation offloading snippet to one of the CSDs 220-1, 220-3, 220-3.

The CSDs 220-1, 220-2, 220-3 include not only storage resources for storing a DB, but also CPU resources (for example, a CSD runtime in FIG. 4) for performing a part of query computations.

Figure 5:
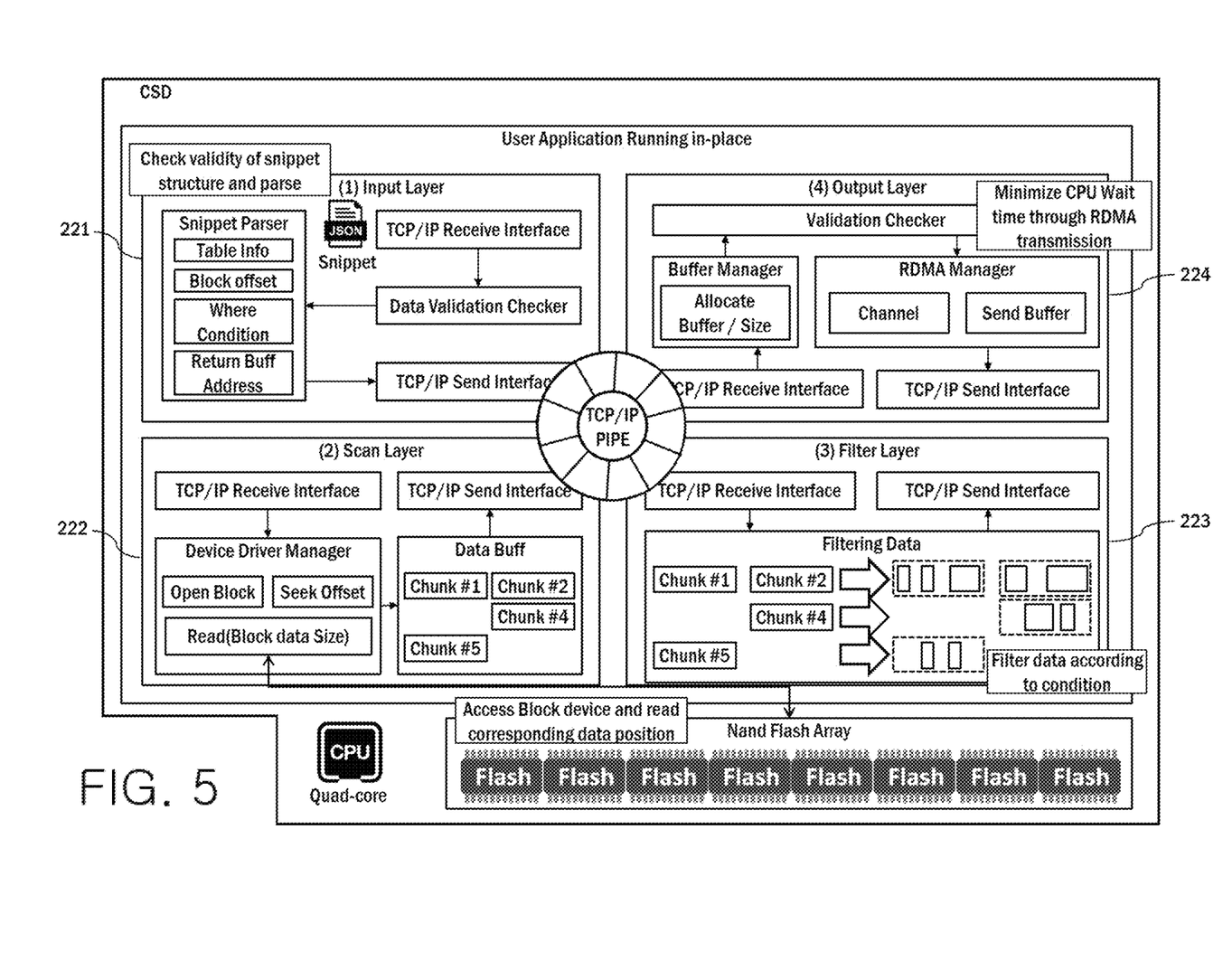
FIG. 5 is a view illustrating a structure of the CSD shown in FIG. 4.

FIG. 5 is a view illustrating a structure of the CSDs 220-1, 220-2, 220-3 shown in FIG. 4. Since the CSDs 220-1, 220-2, 220-3 may be implemented in the same way, only one CSD 220 is illustrated in FIG. 5 as a representative by using reference numeral "220."

As shown in the drawing, the CSD 220 includes an input layer 221, a scan layer 222, a filter layer 223, and an output layer 224.

The input layer 221 checks validity of a query computation offloading snippet received from the RDMA manager 130 of the DBMS 100, and then parses the snippet. The scan layer 222 reads out data stored in a storage drive by performing query scanning.

The filter layer 223 filters a result of scanning by the scan layer 222. The output layer 224 returns the data filtered by the filter layer 223 to the RDMA manager 130 of the DBMS 100.

Figure 6:
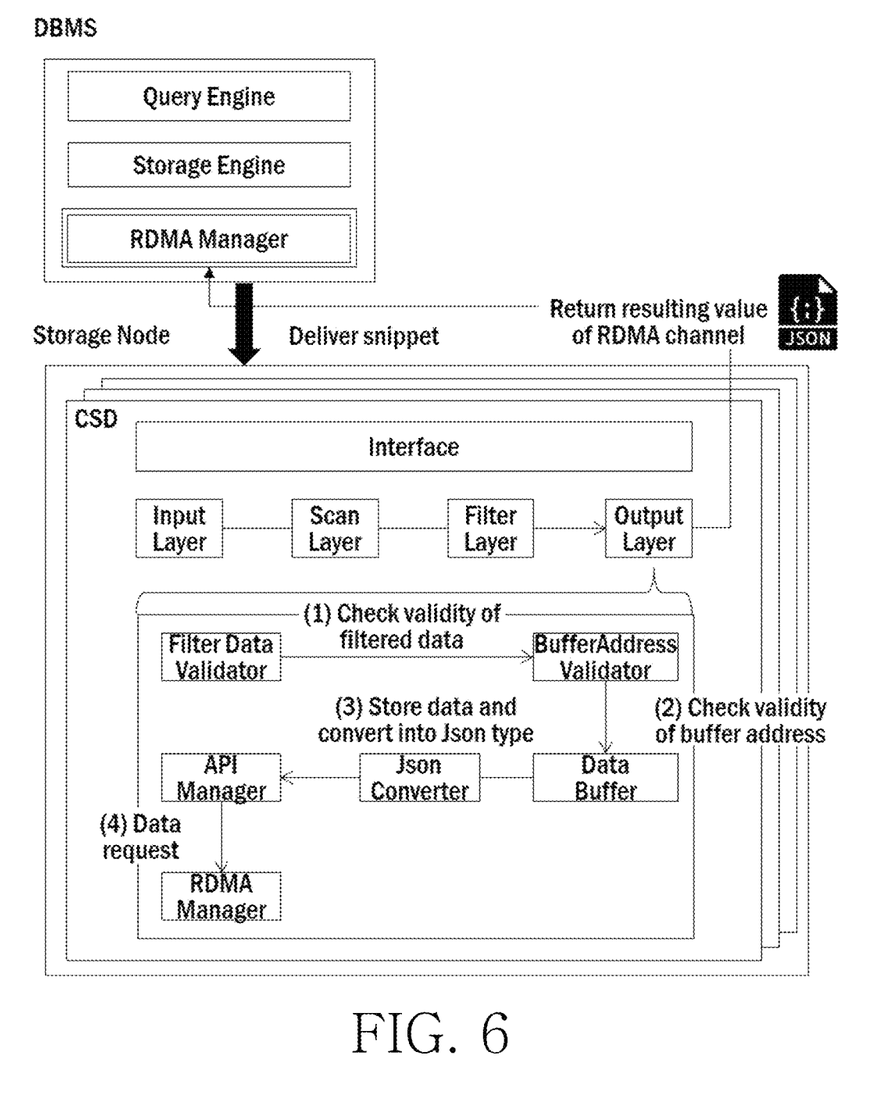
FIG. 6 is a view illustrating operations of the output layer shown in FIG. 5 in detail.

FIG. 6 is a view illustrating operations of the output layer 224 in detail. As shown in FIG. 6, a filter data validator of the output layer 224 may check validity regarding the data filtered by the filter layer 223 (1), and a buffer address validator of the output layer 224 may check validity on a buffer address parsed in the query computation offloading snippet and may store the data in the data buffer of the output layer 224 (2).

Next, a Json converter of the output layer 224 may convert the filtered data which is validated into a Json type (3), and an API manager of the output layer 224 may store the converted data in a buffer of the RDMA manager 130 (4). A buffer address of the RDMA 130 is designated by BufferAddress.

Figure 7:
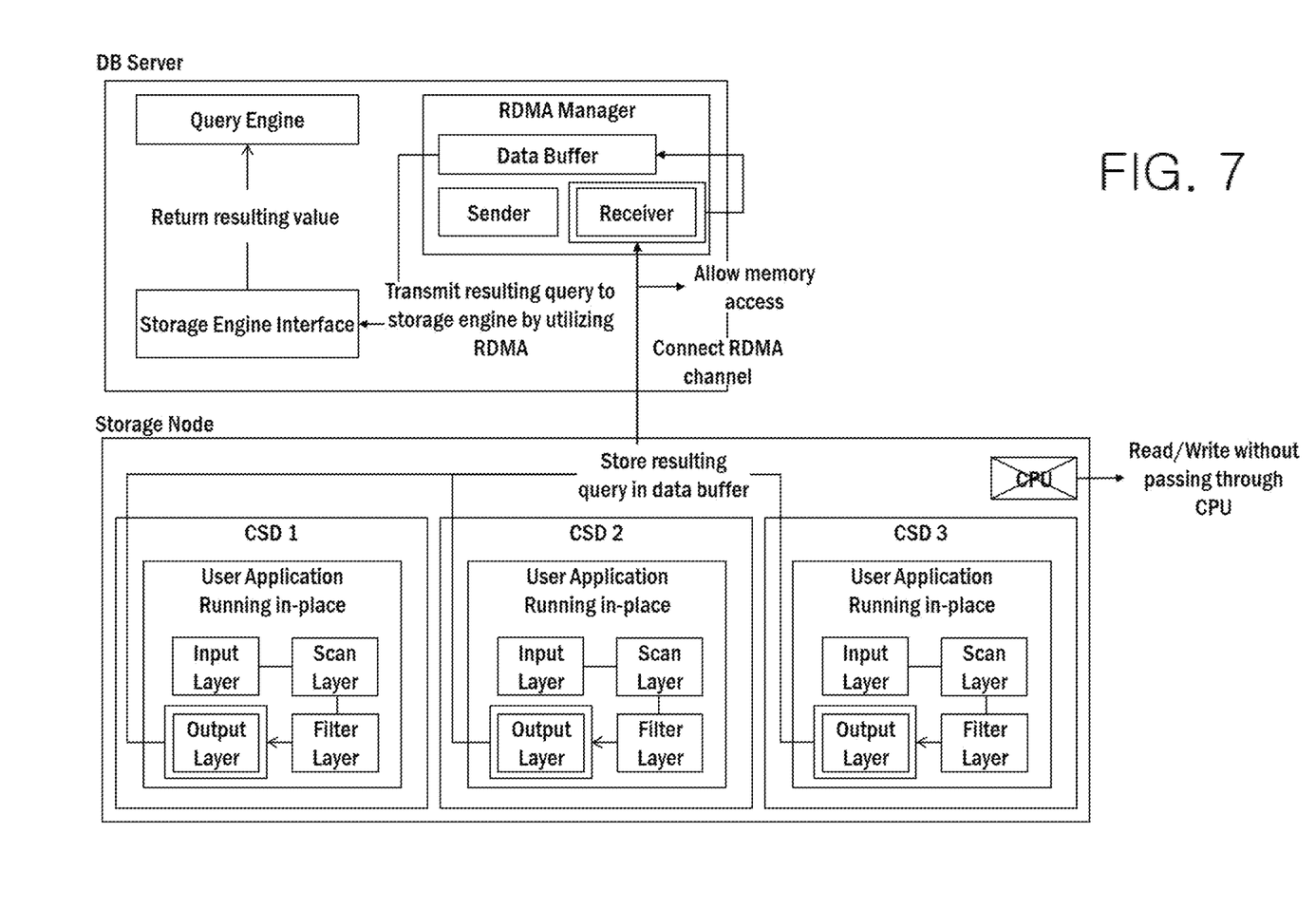
FIG. 7 is a view illustrating a path through which a result of executing a query computation offloading snippet is returned.

As described above, the filtered data may be directly returned by the output layer 224 in an RDMA method without intervention by a CPU. FIG. 7 illustrates a path through which filtered data, that is, a result of executing a query calculation offloading snippet, is returned.

As shown in the drawing, the result of executing the query computation offloading snippet by the CSDs 220-1, 220-2, 220-3 may be directly delivered to a receiver of the RDMA manager 130 connected via an RDMA channel without passing through the CPU, and may be stored in a data buffer of the RDMA manager 130. The result stored in the data buffer may be delivered to the query engine 110 through the storage engine 120.

Figure 8:
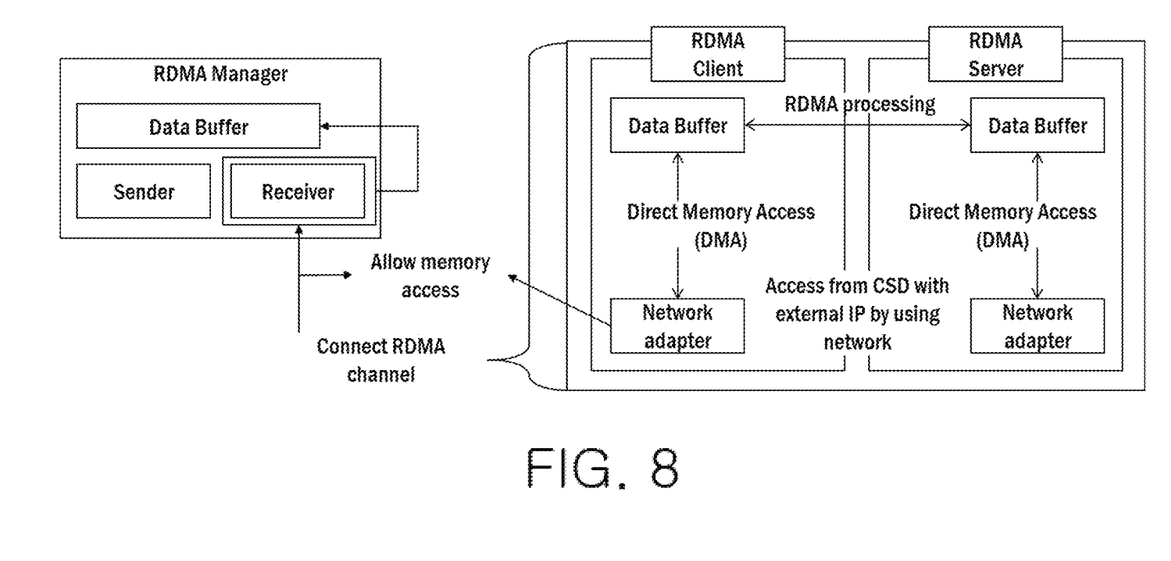
FIG. 8 is a view conceptually illustrating a remote direct memory access (RDMA) channel.

FIG. 8 is a view conceptually illustrating an RDMA channel. As shown in the drawing, the RDMA manger 130 directly delivers a query computation offloading snippet to the CSDs 220-1, 220-2, 220-3 through a network adapter by using an RDMA server, which functions as a sender, and directly receives a result of processing the snippet from the CSDs 220-1, 220-2, 220-3 through the network adapter by using an RDMA client, which functions as a receiver, and may store the result in the data buffer.

Up to now, a method for defining a snippet for offloading a part of query computations to a CSD in a DB system using the CSD, and processing query computations by a DBMS and a storage interworking with each other by using the snippet have been described in detail with reference to preferred embodiments.

Specifically, in an embodiment of the disclosure, a query computation offloading snippet is proposed as a structure for offloading a part of query computations from a DMBS onto a storage when the storage is implemented by using a CSD in a cloud-native environment, in which the DBMS and the storage are disaggregated.

In addition, an RDMA connection interface between the DBMS and the CSD is supported, so that a data transmission speed for an offloading processing process is maximized and a query execution time is reduced.

The technical concept of the disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the art without departing from the scope of the present disclosure claimed in claims, and also, changed embodiments should not be understood as being separate from the technical idea or prospect of the present disclosure.

What is claimed is:

1. A DB system comprising:
a storage node in which a database (DB) is established therein and a computational storage device (CSD) having CPU resources is configured therein; and
a database management system (DBMS) configured to:
generate an offloading code which is a code for offloading a part of query computations for a received query, based on the received query, when a query execution request is received from a client;
determine, by the DBMS, whether to offload the part of the query computations, including determining whether a query engine of the DBMS processes all of the query computations, or alternatively whether the computational storage device (CSD) of the storage node processes a part of the query computations and the query engine of the DMBS processes the other query computations, based on a size of data amount transmitted between the DBMS and the storage;
deliver the offloading code to the storage node in which the database (DB) is established therein and the computational storage device (CSD) having CPU resources is configured therein; and
execute, by a processor of the CPU resources of the CSD, the offloading code corresponding to the computer-executable source code associated with the part of the query computations for the query.

2. The DB system of claim 1,
wherein the generating the offloading code is performed when offloading is determined at the determining.

3. The DB system of claim 2, wherein the DBMS is further configured to determine to offload a part of the query computations when there is a amount of data, transmitted between the DBMS and the storage, exceeding a predetermined size of data.

4. A processor-implemented query offloading method comprising:
generating, by a database management system (DBMS), an offloading code which is a computer-executable source code for offloading a part of query computations for a query, based on the query;
determining, by the DBMS, whether to offload the part of the query computations, including determining whether a query engine of the DBMS processes all of the query computations, or alternatively whether a computational storage device (CSD) of the storage processes a part of the query computations and the query engine of the DMBS processes the other query computations, based on a size of data amount transmitted between the DBMS and the storage;
delivering, by the DBMS, the offloading code to a storage in which a DB is established therein and a computational storage device (CSD) configuring CPU resources is included;
executing, by a processor of the CPU resources of the CSD, the offloading code corresponding to the computer-executable source code associated with the part of the query computations for the query; and
receiving, by the DBMS, a result of executing the offloading code from the CSD.

5. The method of claim 4, further comprising a computational storage device (CSD), wherein the CSD is further configured to:
receive the offloading code from the DBMS;
check validity of the received offloading code, and parsing;
read out data from the DB by scanning the query recorded on the offloading code;
filter the read-out data; and
return the filtered data to the DBMS.

6. The method of claim 5, wherein, for the returning, the CSD is further configured to:
check validity of the filtered data;
check validity of a buffer address recorded on the offloading code;
convert the filtered data into a predetermined type; and
store the filtered and converted data in a buffer indicated by the buffer address.

7. The method of claim 5, wherein the storing comprises moving the data from a buffer of the CSD to a buffer indicated by the buffer address in a remote DMA method without passing through a CPU of the CSD.

8. The method of claim 7, wherein the buffer indicated by the buffer address is a buffer of the DBMS.

9. The method of claim 7, wherein the offloading code is generated as a snippet, and comprises a parsed query and a buffer address of the DBMS.

10. A processor-implemented query offloading method comprising:
receiving, by a database management system (DBMS), a query execution request for a query from a client;
generating, by the DBMS, an offloading code which is a computer-executable source code for offloading a part of the query computations for the query, based on the query, and determining, by the DBMS, whether to offload the part of the query computations, including determining whether a query engine of the DBMS processes all of the query computations, or alternatively whether a computational storage device (CSD) of a storage processes a part of the query computations and the query engine of the DMBS processes the other query computations, based on a size of data amount transmitted between the DBMS and the storage;
delivering, by the DBMS, the offloading code to the storage in which a database (DB) is established in the computational storage device (CSD) configuring CPU resources; and
executing, by a processor of the CPU resources of the CSD, the offloading code corresponding to the computer-executable source code associated with the part of the query computations for the query.

11. The query offloading method of claim 10,
wherein the generating the offloading code is performed when offloading is determined.

12. The query offloading method of claim 10, wherein the determining comprises determining to offload a part of the query computations when there is a amount of data, transmitted between the DBMS and the storage, exceeding a predetermined size of data.

13. The query offloading method of claim 10, further comprising:
receiving, by the CSD of the storage, the offloading code from the DBMS;
checking, by the CSD, validity of the received offloading code, and parsing;
reading out, by the CSD, data from the DB by scanning the query recorded on the offloading code;
filtering, by the CSD, the read-out data; and
returning, by the CSD, the filtered data to the DBMS.

14. The query offloading method of claim 13, wherein the returning further comprises:
checking, by the CSD, validity of the filtered data;
checking, by the CSD, validity of a buffer address recorded on the offloading code;
converting, by the CSD, the filtered data into a predetermined type; and
storing, by the CSD, the filtered and converted data in a buffer indicated by the buffer address.

15. The query offloading method of claim 13, wherein the storing comprises moving the data from a buffer of the CSD to a buffer indicated by the buffer address in a remote DMA method without passing through a CPU of the CSD.

16. The query offloading method of claim 15, wherein the buffer indicated by the buffer address is a buffer of the DBMS.

17. The query offloading method of claim 15, wherein the offloading code is generated as a snippet, and comprises a parsed query and a buffer address of the DBMS.

* * * * *